Patented June 12, 1945

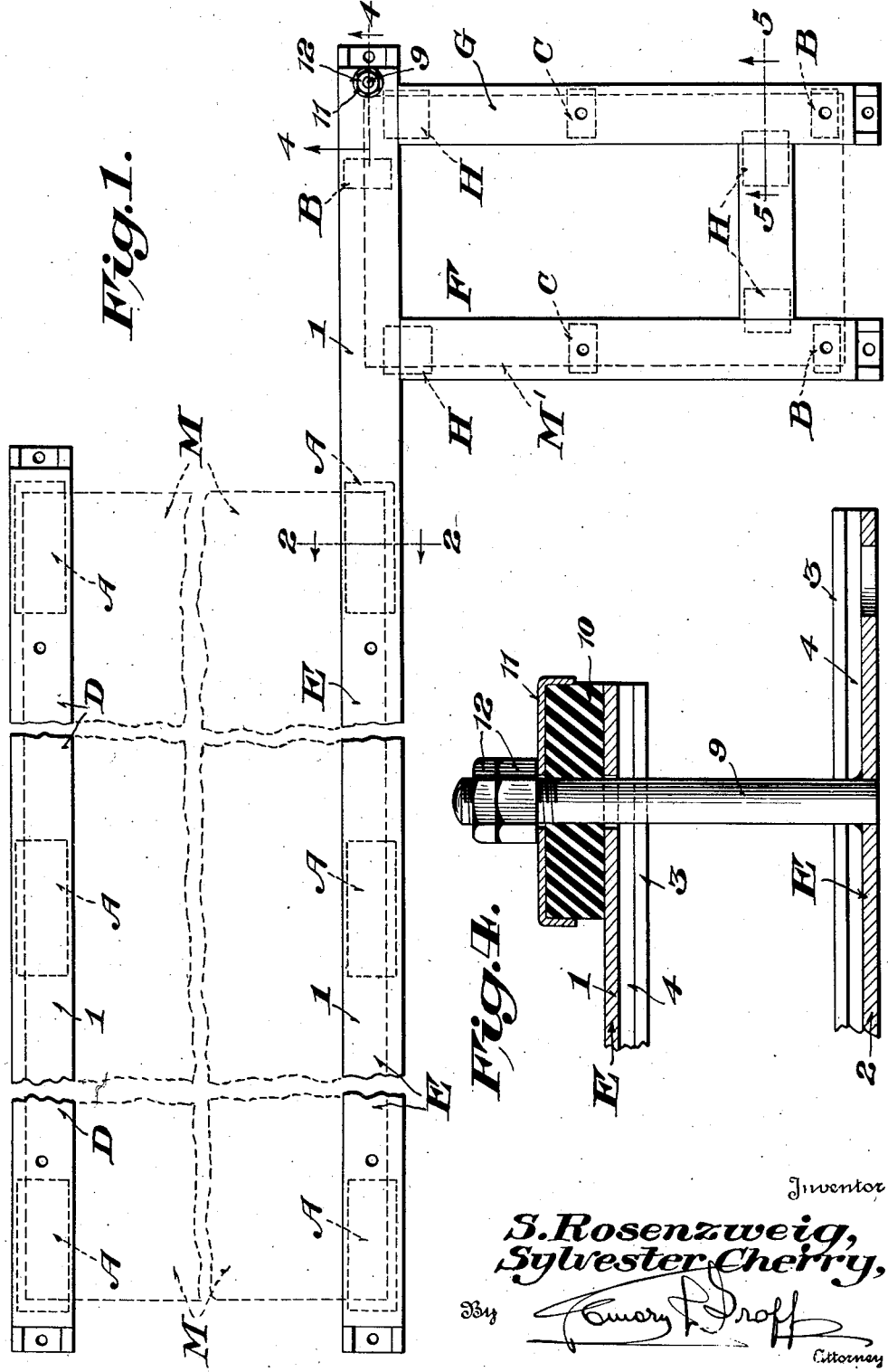

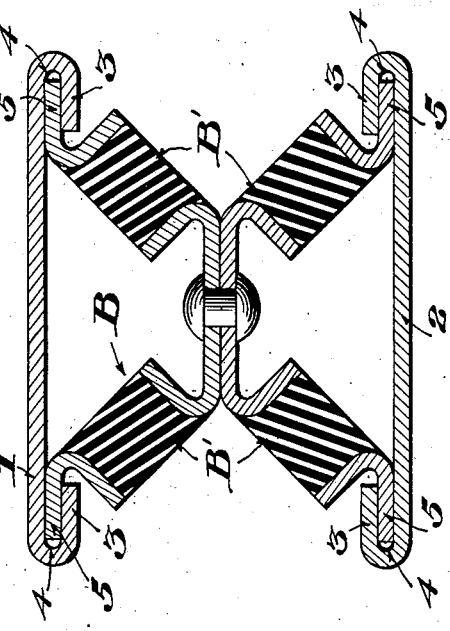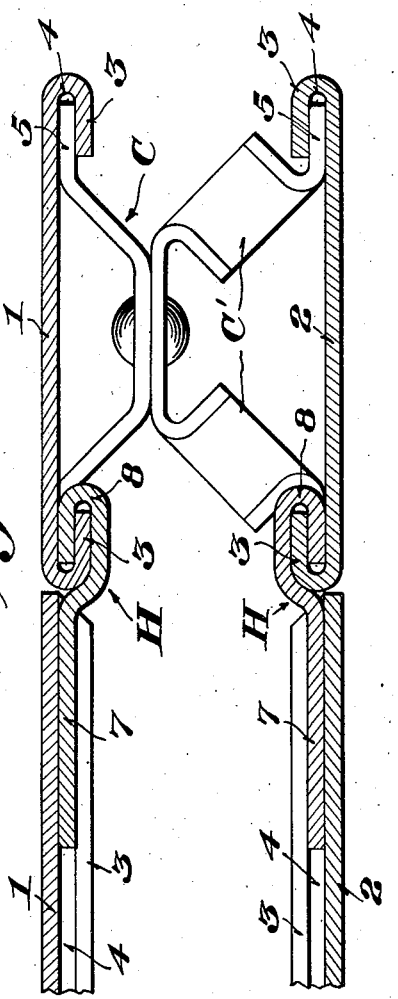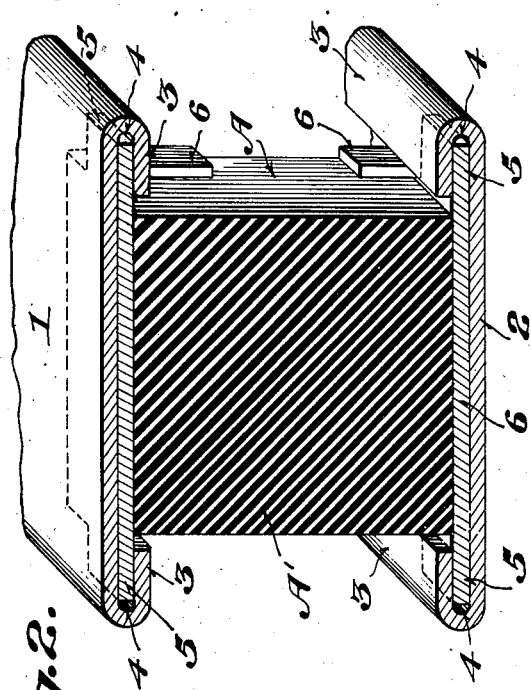

2,378,106

UNITED STATES PATENT OFFICE 2,378,106

MACHINERY BASE

Siegfried Rosenzweig, New York, and Sylvester Cherry, Lake Success, N. Y.; said Cherry assignor to said Rosenzweig Application September 19, 1944, Serial No. 554,836

7 Claims. (Cl. 248—22)

This invention relates to means for supporting operating machines on a floor or foundation, and more particularly to what is generally known as a machinery base.

A primary object of the invention is to provide a construction which lends itself to fabrication from pre-formed parts in the respect that the several parts or units ultimately comprising the complete installation, may be made up in accordance with standard manufacturing practices and kept in stock so that when a machinery base is to be made in accordance with a particular specification, the several parts thereof may be readily assembled by simple operations requiring a minimum of manual labor. In that connection, the invention contemplates a machinery base composed of frame units including top and bottom rails of duplicate cross-sectional shape and which may be made in standard lengths and then cut into the sectional length desired for a particular installation. These rails may then be assembled together with vibration absorbing units in such a way that said units themselves maintain the rails connected in superposed relation, thereby not only providing the means for connecting rails, but also enabling the vibration absorbing units to be readily placed at the desired locations to provide elongated frame elements of an isolation base.

A further object of the invention is to provide not only novel frame members each comprising the rails and their interconnecting units, but also to provide novel means for connecting one frame member with another in angular relation. That is to say, special means is provided for connecting the upper and lower rail members of each frame with related rail elements of an adjacent frame, which may be disposed, for example, at right angles thereto.

With the above and other objects in view, which will more readily appear as the nature of the invention is better understood the same consists in the novel construction, combination, and arrangement of parts, hereinafter more fully described, illustrated, and claimed.

A preferred and practical embodiment of the invention is shown in the accompanying drawings, in which:

Figure 1 is a more or less diagrammatic plan view illustrating a machinery base including parallel and right-angularly disposed isolating frame elements formed in accordance with the present invention.

Figure 2 is a vertical cross-sectional view taken on the line 2—2 of Figure 1 showing a relatively heavy-duty isolation unit for the portion of the frame elements which support the heaviest machine or machine part.

Figure 3 is a detail vertical sectional view illustrating the use of a modified form of isolation unit.

Figure 4 is a vertical sectional view taken on the line 4—4 of Figure 1.

Figure 5 is a vertical sectional view taken on the line 5—5 of Figure 1 and illustrating means for coupling right-angularly disposed frame members and also showing a modified form of isolation unit.

Similar reference characters designate corresponding parts throughout the several figures of the drawings.

In its primary aspect the present invention includes a substantially channel-shaped rail member which may be fabricated in standard lengths and then cut to form what will be termed, for purpose of illustration, a top rail 1 and a bottom rail 2. These members are held in vertically spaced relation, as well as interlocked with each other, by any one of a number of vibration absorbing or isolation devices designated generally as A, B and C. When the top and bottom rails 1 and 2 are connected by and with the said vibration devices A, B and C, as will presently appear, they may be laid in parallel or angular relation to form the frames D, E, F and G of the machinery base shown in Figure 1 for supporting the machine or machines M and M' whose platforms are indicated by the rectangular dotted lines.

Referring now more in detail to the structural features involved, it will be observed that the rails 1 and 2 preferably include a web portion, each having marginal inturned flanges 3 which provide keeper means for receiving locking elements carried by isolation units, as will presently appear, the said keeper means being for example in the form of inwardly facing grooves 4 at the opposite sides of each rail. Since the rails 1 and 2 are cut from common stock, they are of duplicate cross section. And, as will be seen from the drawings, said rails 1 and 2 are assembled with their flanged portions 3 facing each other.

The particular characteristics of the vibration absorbing or isolation units A, B and C may in themselves vary in individual design, but in all cases, said units A, B and C include a body or frame-work which is provided with outwardly projecting tongue portions 5 intended to be slidably fitted or placed within the channels 4.

Figure 2 illustrates a relatively heavy-duty isolation vibration absorbing unit A which is of substantially of block or box form, whereas the units B and C are of relatively light skeleton form in cross section, resembling a substantial X formation. However, the unit A is so constructed that the casing 6 which houses the vibration absorbing means A', is provided with offset tongues 5 which slidably fit into the channels 4 as above indicated, using a hammer or mallet if force is necessary.

Referring to the isolation units A and C, which include the vibration absorbing means A' and C', in the manner shown, it will readily be understood that the outwardly projecting tongues 5—5 at the upper and lower corners thereof may be slidably fitted in the grooves 4—4 of the upper rail 1 and simultaneously fitted in the grooves 4—4 of the lower rail 2 by a sliding movement.

When the top and bottom tongues 5—5 of the units A, B and C are interlocked with the grooves 4—4 of the rails 1 and 2, it will be apparent that the latter are held in vertically spaced relation and are thus assembled into the form of the frames, for example, the frames D, E, F and G. When thus assembled, it will of course be understood that the said frames may be disposed in the desired manner beneath a machine to support the latter on the floor or foundation.

As previously indicated, the frame units D and E, constructed as described, may be laid in parallel relation. When it is desired to provide frame units disposed at right angles to either D or E, for example, as those designated as F and G, a practical and durable form of coupling H is provided for the end of each of the rails 1 and 2 which lie adjacent similar rails of a related contiguous frame member. These coupling members H preferably consist of a shank 7 which is welded or otherwise secured to the inner face of the web of the rails 1 and 2, and the hook portions 8 which are intended to fit into the right angularly disposed grooves 4—4 of the related rails of a contiguous frame member. These coupling members will thus hold or anchor the right angularly disposed frame elements together. The hooks 8 may be applied in the grooves 4 of the rails 1 and 2 by sliding them into place in the same fashion as the tongues 5—5 of the units A, B and C.

In order to prevent oscillation of the ends of the frame members D and E, the ends of the rails 1 and 2 composing the same may be tied together by means shown in Figure 4. For example, the bottom rail 2 may be provided with a bolt 9 which extends upwardly through an opening in the top rail 1. The portion of the bolt which projects through the opening is surrounded by a disc 10 of vibration absorbing material, substantially in the form of a washer. The member 10 rests on the upper or outer face of the rail 1 and is preferably engaged or partially housed by a metallic cup-like disc 11, which is in turn pressed against the washer 10 by suitable nut means 12 or its equivalent on the top end of the bolt 9. It will of course be understood that the tension or pressure of the nut means 12 may be adjusted as desired.

From the foregoing, it is believed that it will be apparent that the present invention provides novel rail members and vibration absorbing units having novel means of assembly with respect to said rails, thereby not only enabling the assembly of complete frame elements with great facility and positiveness, but at the same time making possible the various combinations of frame elements from parts designed to properly interfit in the novel manner described.

Without further description, it is thought that the features and advantages of the invention will be readily understood by those skilled in the art.

We claim:

1. A vibro-isolator construction, including, frame members consisting of top and bottom rails each comprising web portions having marginal inturned flanges arranged to face each other at the inner sides of the rails, said flanges of each rail being spaced from the inner face thereof to provide grooves, and isolation units each having laterally projecting top and bottom key portions fitted in said grooves and holding said rails assembled in spaced relation.

2. A vibro-isolator construction, including, frame members consisting of top and bottom rails each comprising web portions having marginal flanges, isolation units interlocked with said flanges to maintain the rails in spaced relation, and means for yieldingly connecting the webs of the rails at the related ends of each frame.

3. A vibro-isolator construction, including, frame members consisting of top and bottom rails each comprising web portions having marginal inturned flanges arranged to face each other at the inner sides of the rails, said flanges of each rail being spaced from the inner face thereof to provide grooves, isolation units each having laterally projecting top and bottom key portions fitted in said grooves and holding said rails assembled in vertically spaced relation, and means for yieldingly connecting the free ends of said rails together.

4. A vibro-isolator construction, including, frame members each consisting of top and bottom rails comprising web portions having marginal inturned flanges arranged to face each other at the inner sides of the rails, said flanges of each rail being spaced from the inner face thereof to provide grooves, isolation units each having pairs of laterally projecting top and bottom key portions fitted in said grooves and holding said rails assembled in vertically spaced relation, and means for connecting the free ends of said rails together, said means comprising a bolt having one end secured to the bottom rail and extending through an opening in the top rail, a resilient member surrounding the portion of the bolt projecting above the top rail and bearing on the upper face of the top rail, and nut and washer means on the upper end of the bolt for compressing said resilient member.

5. A vibro-isolator construction, including, frame members each consisting of top and bottom rails adapted to be laid in parallel or angular relation, said rails each comprising web portions having marginal inturned flanges arranged to face each other at the inner sides of the rails, said flanges of each rail being spaced from the inner face thereof to provide grooves, isolation units each having pairs of laterally projecting top and bottm key portions respectively fitted in said grooves of the top and bottom rails and holding said rails assembled in vertically spaced relation, means for connecting the rails which are laid in angular relation, said means comprising coupling members secured at one end to each rail of a related pair and having hook-like flanges at the other end for entering the guideways of the rails of an adjacent angularly disposed frame.

6. A vibro-isolator construction, including, frame members each consisting of top and bottom rails adapted to be laid in parallel or angular relation, said rails each comprising web portions having marginal inturned flanges arranged to face each other at the inner sides of the rails, said flanges of each rail being spaced from the inner face thereof to provide grooves, isolation units each having pairs of laterally projecting top and bottom key portions respectively fitted in said grooves of the top and bottom rails and holding said rails assembled in vertically spaced relation and means carried by the end of an angularly disposed frame member which abuts another frame member between its ends to connect said members together.

7. A vibro-isolator construction, including frame members consisting of top and bottom rails each comprising web portions having marginal keeper means, and isolation units each having top and bottom key portions fitting in said keeper means to maintain the rails connected in spaced relation and hold them against vertical or horizontal displacement.

SIEGFRIED ROSENZWEIG.
    SYLVESTER CHERRY.